(No Model.) 2 Sheets—Sheet 1.

H. R. TOWNE.
APPARATUS FOR SEPARATING DUST FROM AIR.

No. 418,545. Patented Dec. 31, 1889.

WITNESSES
E. A. Newman
C. M. Newman.

INVENTOR
Henry R. Towne,
By his Attorneys
Baldwin Hopkins & Peyton.

(No Model.) 2 Sheets—Sheet 2.

H. R. TOWNE.
APPARATUS FOR SEPARATING DUST FROM AIR.

No. 418,545. Patented Dec. 31, 1889.

WITNESSES
E. A. Newman,
C. M. Newman.

INVENTOR
Henry R. Towne,
By his Attorneys
Baldwin Hopkins & Peyton.

UNITED STATES PATENT OFFICE.

HENRY R. TOWNE, OF STAMFORD, CONNECTICUT, ASSIGNOR OF ONE-HALF TO EMORY STOCKWELL, OF SAME PLACE.

APPARATUS FOR SEPARATING DUST FROM AIR.

SPECIFICATION forming part of Letters Patent No. 418,545, dated December 31, 1889.

Application filed December 7, 1886. Serial No. 220,894. (No model.)

*To all whom it may concern:*

Be it known that I, HENRY R. TOWNE, of Stamford, in the county of Fairfield and State of Connecticut, have invented a certain new and useful Apparatus for Separating Dust from Air, of which the following is a specification, reference being had to the accompanying drawings.

The object of my invention is to provide a peculiar apparatus for separating the fine particles of metallic or other dust (caused by grinding and polishing operations) from the atmosphere which contains them and collecting them in a mass, so that the metallic particles may be saved, melted, and used, all in the manner hereinafter explained in detail.

Accordingly, my invention consists in a peculiar apparatus for accomplishing that object, such as I will first set forth in detail, and then succinctly sum up in my appended claims.

Figure 2:
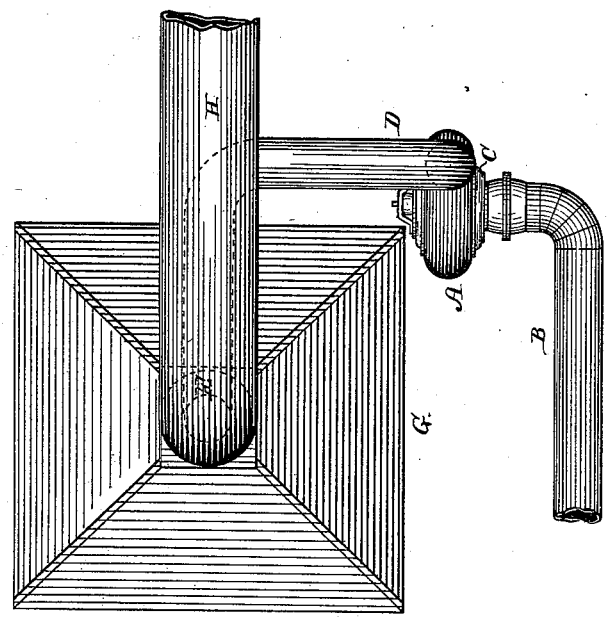
Figure 1:
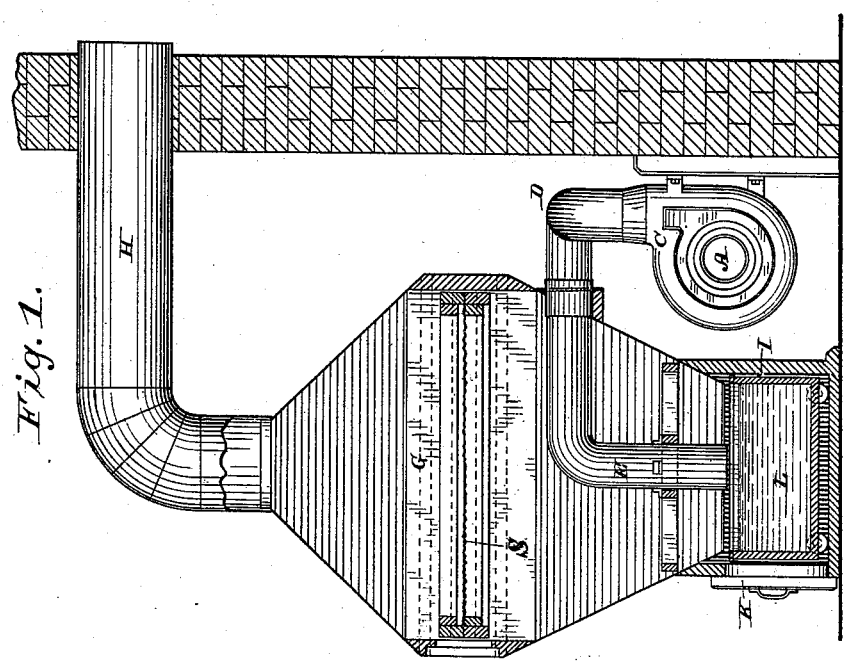
Figure 3:
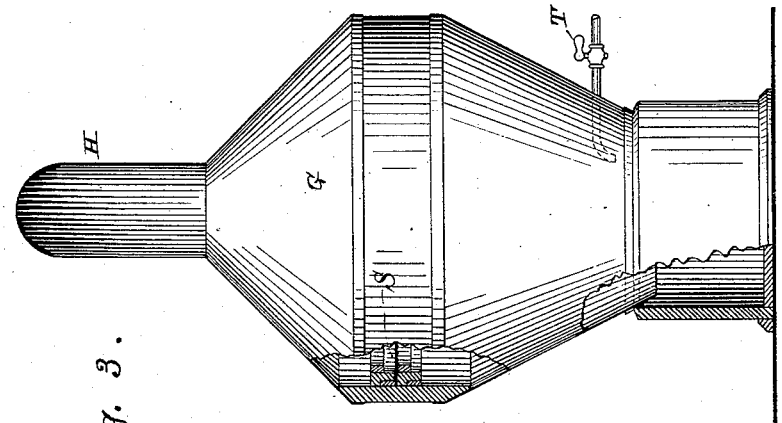

In the accompanying drawings, illustrating a form of embodiment of my invention which I deem the best, Figure 1 is an elevation, partly in section. Fig. 2 is a top view; Fig. 3, another elevation, partly in section; and Fig. 4, another elevation, partly in section.

Referring to the letters upon the drawings, A indicates an ordinary exhaust fan or blower, which is to be connected by means of a suction pipe or pipes B with the rooms or machines from which dust is to be removed—such as an emery-wheel or grinding wheel or wheels—in the usual way.

C indicates an air-reservoir around the blower, and D an outlet-pipe, the arrangement being that the current of air conveying the dust and fine particles of metal will be drawn by the operation of the fan into the reservoir and discharged out of the pipe E downward upon the surface of water contained in any suitable water-receptacle. The dust-impregnated air being driven forcibly onto the surface of the water, much of the dust will be entrained by the water and deposited in the bottom of the water-receptacle, the air escaping upward in a more or less purified condition into an enlarged chamber G, and thence outward through the pipe H into the open atmosphere.

Figure 4:
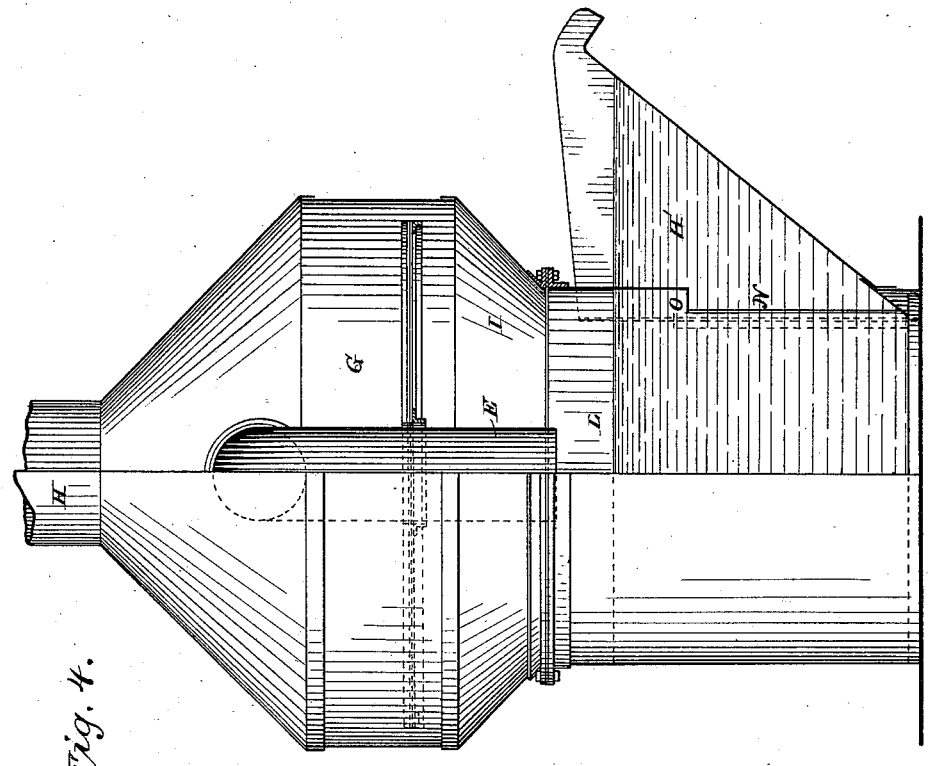

I may provide an air-tight chamber for the reception of a removable water-box, as shown in Fig. 1, where I is the air-tight chamber provided with a door K, and L is the removable water-box; but in some cases it will be preferable to have the air-chamber and the water-box formed in one vessel, provided with a lateral spout or extension, as shown in Fig. 4, where I is the air-chamber and L the water-box, secured together by bolts, as indicated, or in any usual way.

H' is a lateral spout or extension of the water-box, the sides of which rise above the water-level. This extension communicates with the water-box by an opening N, commencing considerably below the water-level, so that the metal wall of the water box or separator extends downward at O and forms a dam or trap, which separates the upper part of the water in the separator from that in the upper part of the spout. In this way a seal is formed, which prevents the escape of air from within the separator through the spout, and yet leaves open a passage under water from the spout to the separator, by means of which the mud or mass of metallic particles at the bottom of the separator can at any time be conveniently removed by inserting a scraper or other suitable implement through the spout.

As the discharge of the current of dust-impregnated air upon the surface of the water may not always thoroughly cleanse the air and cause the deposition of the entire mass of impurities in the water-receptacle, I have provided within the enlarged air-chamber G, above the water, suitable removable screens S—one or more—of ordinary construction, as shown in Fig. 1. These air-screens S, which I prefer to form of fine bolting-cloth, being in that part of the chamber where its transverse area is greatest, and where, therefore, the velocity of the air is proportionately reduced, serve more effectively than they otherwise would to screen the remaining solid matter or impurities from the escaping current of air. As these accumulate on the under sides of the screens they fall down into the water and are thus absorbed by the latter; or if they adhere to the screens they are recovered and removed by occasionally withdrawing the screens and cleaning them. This screening of the air is auxiliary to the water-purifying, and is useful accordingly.

In Fig. 3, T indicates a water-cock for supplying water to the water-box.

By means of this apparatus embodying my invention not only may workmen be protected from the inhalation of dust, but valuable metals can be so profitably recovered that the saving soon pays for the cost of the apparatus.

In using this invention the water-level in the water-box should, preferably, as a general rule, be a few inches from the end of the pipe E, just enough to permit the air to escape freely; but the distance may be varied according to circumstances.

Having thus described my invention, what I claim to be new, and desire to secure by Letters Patent of the United States, is—

1. The combination of a blower, an air-purifying chamber having an outlet, a receptacle containing water, and a lateral extension to the receptacle, which is provided with a water seal and gives access from one side for cleaning out the water-receptacle, substantially as set forth.

2. The combination of a blower, a receptacle containing water, an air-purifying chamber having an enlargement and an air-outlet, and a screen for purifying air, located in the enlarged portion of the chamber, substantially as set forth.

In testimony whereof I have hereunto subscribed my name.

HENRY R. TOWNE.

Witnesses:
SCHUYLER MERRITT,
GEO. E. WHITE.